Dec. 9, 1969  G. HOPP  3,482,897

PERISCOPE

Filed Oct. 24, 1966  3 Sheets-Sheet 1

Dec. 9, 1969    G. HOPP    3,482,897
PERISCOPE

Filed Oct. 24, 1966    3 Sheets-Sheet 3

United States Patent Office 3,482,897
Patented Dec. 9, 1969

3,482,897
PERISCOPE
Gerhard Hopp, 33/VI Sonnenstrasse,
8 Munich 15, Germany
Filed Oct. 24, 1966, Ser. No. 589,031
Claims priority, application Germany, Oct. 29, 1965,
H 57,552
Int. Cl. G02b 23/08
U.S. Cl. 350—52                           8 Claims

ABSTRACT OF THE DISCLOSURE

A periscope for obtaining a broad field of view from within a closed structure by substantially filling the area between the objective and eye piece reflective surfaces with first converging and diverging lenses forming a first system, the lenses having substantially the same focal plane, and second converging and diverging lenses forming a second system, the lenses having substantially the same focal plane. The converging lenses of each system are mounted adjacent one another.

---

Figure 1:
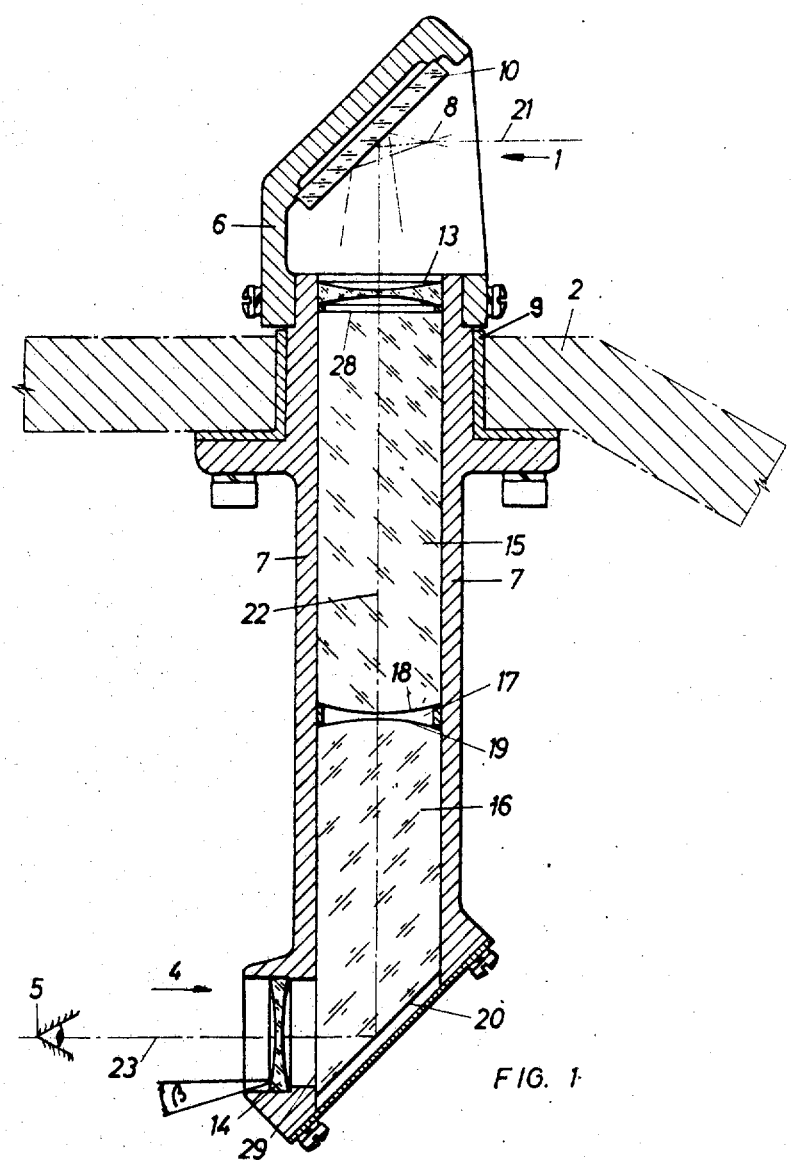

The present invention relates to a periscope and, more particularly, to a periscope for the viewing of an object field from a blind.

For viewing from tanks, floating vessels and fortifications, there is the problem of combining the smallest decrease in the coverage with the broadest and highest possible field of view. Since, in general, a field of view which extends widthwise is more urgently required than a vertically extending field of view, the objective opening was developed as an objective slit of great width and slight height as a compromise. Starting from this objective slit in the known arrangements, the beam is deflected via angular reflectors to the observer who, therefore, is under cover and not opposite the objective opening. By the arrangement of the deflecting mirrors, the field of view is limited as compared with the case when the observer is in the immediate vicinity of the objective slit and the limiting angle within which a field of view still just results is reduced, the constricting of the field of view and the size of the limiting angle depending on the length of the system or reflecting mirrors.

It is also known that the field of view and limiting angle can be increased for the same length of system by filling the space between the mirrors with a medium of a higher index of refraction than air.

For example, if B is the width of the objective opening, H the height of the objective opening, S the system length of the arrangement of reflecting mirrors, $\alpha'$ the limiting angle in widthwise direction when using air as intermediate medium, $\alpha$ the limiting angle in widthwise direction when using glass or plastics as intermediate medium, $\beta'$ the limiting angle in vertical direction when using air as intermediate medium, $\beta$ the limiting angle in vertical direction when using glass or plastic as intermediate medium and $n'$ the index of refraction of said glass or plastic, we then have:

$\sin \alpha = n' \cdot \sin \alpha'$ and $\sin \beta = n' \cdot \sin \beta'$ and $\tan \alpha' = B/S$ and $\tan \beta' = H/S$.

Since the indices of refraction of ordinary glass and plastics are between $n' = 1.5$ and $1.7$, the gain in the field of view or limiting angle is still not large.

In order to obtain a larger limiting angle for the narrow side of the field of view it has been proposed to arrange two cylindrical lenses or cylindrical concave mirrors at a distance $f_1 + f_2$ equal to the sum of their focal lengths from each other and to fill the intermediate space with a glass or plastic block in such a manner that the optical axis is reflected three times. However, the periscopes of this type have the disadvantage that they can be used only for relatively smaller angles of view. This means that, in practice, the known systems can be used only for the narrow side H of the field of view, i.e. therefore, only for an enlarging of the field of view in vertical direction (angle $\beta$). If the tangent of the limiting angle $\alpha'$ or $\beta'$ is above a given value (for instance 0.16) which, as a rule, is true in the case of the wide side B, then the aperture ratio of the projected optical system is so unfavorable that it cannot be used in practice.

It is therefore an object of the present invention to provide a periscope the object field or field of view of which is larger in vertical and horizontal direction than the object field or field of view of a mirror periscope, having a glass or plastic body filled between its mirrors.

Another object of the invention is to provide a periscope whose field of view in the widthwise direction is greater than that of a periscope which contains two lenses spaced apart by a distance equal to the sum of the focal lengths.

Another object of the invention is to provide a periscope which is insensitive to weapon fire and other external influences.

Another object of the invention is to provide a periscope arrangement in connection with which the observer need not move his head to any great distance for observation through several periscopes.

Figure 2:
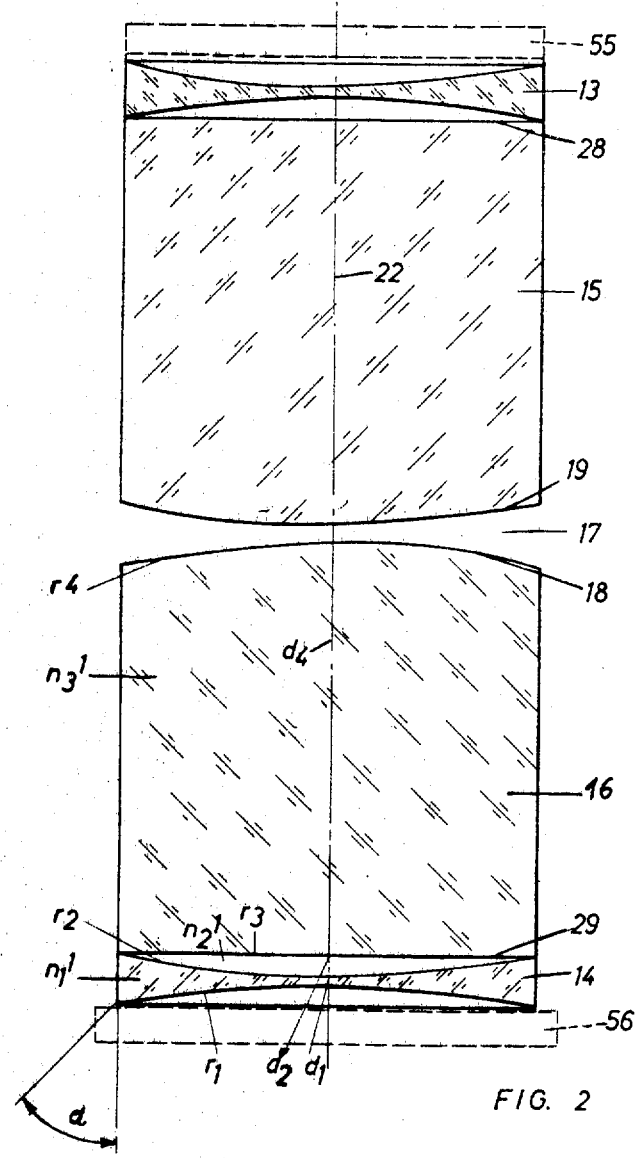
Figure 3:
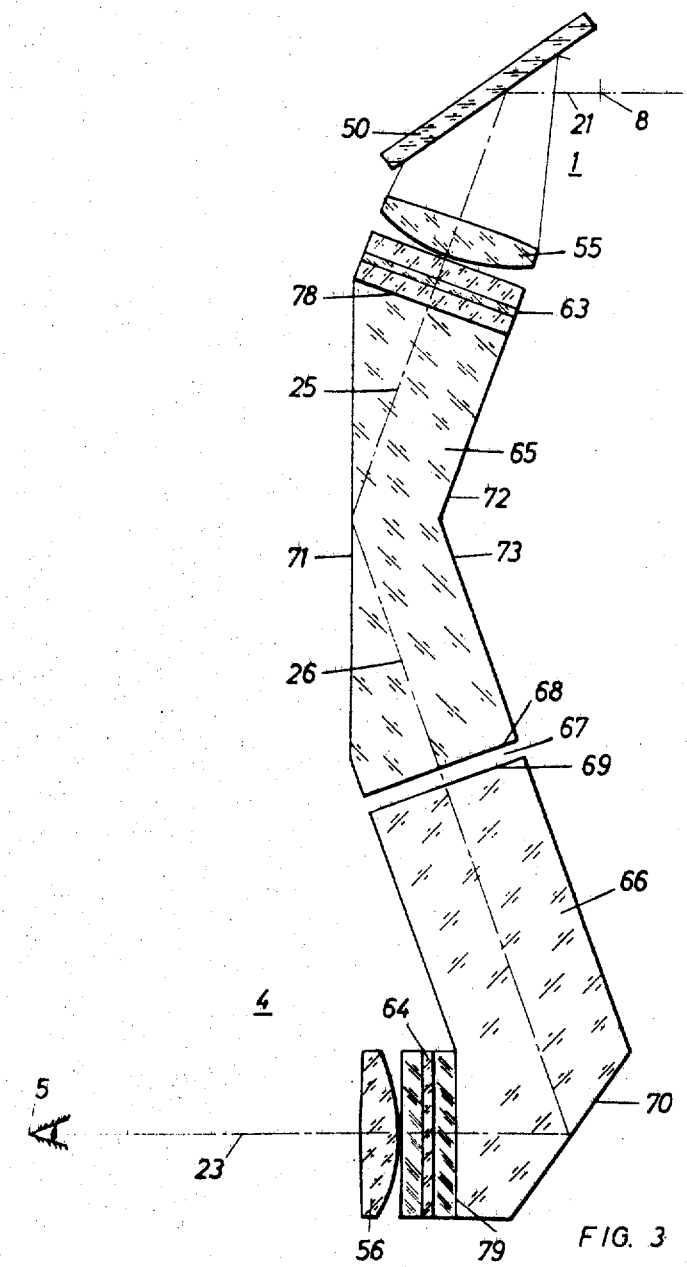

Further objects and advantages as well as features of the invention will become evident from the following description read in conjunction with the drawing in which:

FIG. 1 shows an installed periscope in cross-section;
FIG. 2 is a section along the optical axis of FIG. 1; and
FIG. 3 is a cross-section through another embodiment.

In FIG. 1 there is shown a section through the viewing opening 1 of an armored vehicle as well as the periscope in accordance with the invention. The vehicle wall 2 encloses a protective space for a periscope-eyepiece opening 4 and for the observer, the eye of the observer being brought to a line or point 5 which will be explained further below.

The periscope is held in its position by two housings 6 and 7. The first housing 6 is placed on a collar of the housing 7, and the second housing 7 is inserted in a water-tight manner in the wall 2 by means of a packing 9 in an opening of the wall. The viewing (objective) opening 1 is rectangular in vertical cross-section and substantially wider than high and contains another line or point 8, to be explained below. An can be noted from a comparison of FIGS. 1 and 2, the cross-sectional size of the periscope is selected in accordance with the shape of the objective opening 1.

The periscope contains, as a first reflective surface, a flat metal mirror 10 which lies transversely in the objective opening 1, fits the latter and is accordingly of rectangular shape. The mirror 10 is fastened in suitable manner to the housing 6. The periscope further contains, as optically diverging partial systems, two concave lenses 13 and 14 which are adapted to the shape of the objective opening 1 and accordingly have a rectangular cross-section in planes perpendicular to their optical axis. The curvature of the surfaces in the two planes of FIGS. 1 and 2 which are perpendicular to each other is the same, and point 5 is a virtual focal point of the lens 14 while point 8 is a virtual focal point of the lens 13. However, it is also possible to make the curvatures in the said planes different or to omit same in one of these planes. The focal points would then degenerate into focal lines which, at the points 5 and 8, are perpendicular to the plane of the drawing of FIG. 1.

The periscope also contains, as optically converging partial systems, two convex lenses 15 and 16 of block-like development which supplement each other to form a prism which is of rhombic longitudinal section but for annular slit 17. Each lens 15 and 16 may have at least one curved limiting surface 18 and 19, respectively, which surfaces lie close together or in contact with each other. It is to be understood that "close" or "adjacent" refers to a distance which is small as compared with the radii of curvature of the limiting surfaces 18 and 19 respectively, and constitutes only a fraction of said radii of curvature. The curvatures of the limiting surfaces of the lens 15 are such that the point 8 is a focal point and the curvatures of the limiting surfaces of the lens 16 are such that the point 5 is a focal point. Also, the oblique side of the prism is developed as a reflective surface 20.

A beam penetrating along the optical axis will thus be reflected on the reflective surfaces 10 and 20 so that a section 21 of the optical axis on the objective side, a central section 22 and an eyepiece section 23 can be distinguished from each other, the objective section 21 being parallel to the eyepiece section 23. In the embodiment shown in the drawing, the limiting surfaces 28 and 29 of the lenses 13 and 14, respectively, which face away from each other are flat, this being relatively easy to manufacture. As seen in FIG. 1, the flat limiting surface 28 is perpendicular to the section 22 and the flat limiting surface 29 perpendicular to the section 23.

If reproduction in natural size of the field of view is desired, then the reduction in image effected by the first system of members (lenses 13 and 15) is made to correspond precisely to the image enlargement of the second system of members (lenses 14 and 16). Viewed in this manner, the first system of members can be considered an inverted Galilean telescope in connection with which the focal lengths coincide (or at least substantially coincide) with point 8. The second system of members consists also of a Galilean telescope, the common focal point of which also at least substantially coincides with the point 5. The two optically converging individual systems, i.e. the lenses 15 and 16, are opposite each other; while the two optically diverging individual systems, namely the lenses 13 and 14, face away from each other. The curvatures of the lenses 13 and 14 on the one hand and the curvatures 18 and 19 on the other hand are preferably made equal and the annular slit 17 is placed in the center of the system.

Referring to FIG. 2, the following data may be used in the application of the present invention:

$r_1 = -500$ mm., $r_2 = +500$ mm., $r_3 = 00$, $r_4 = 335$ mm.; $d_1 = 10$ mm., $d_2 = 10$ mm., $d_3 = 234$ mm.; $n'_1 = 1.52$, $n'_2 = 1.0$, $n'_3 = 1.25$.

Referring to the length $l = s/2$ of the system of members, the above data may be expressed as follows:

$r_1 = 1.97$ $l$, $r_2 = +1.97$ $l$, $r_3 = 00$, $r_4 = -1.32$ $l$; $d_1 = 0.0394$ $l$, $d_2 = 0.0394$ $l$, $d_3 = 0.922$ $l$.

As seen from the above, the two systems of members are symmetrical to each other and have the same measurements and parameters. The periscope has a system length of 508 mm.

If one compares this periscope with a periscope in which the parts 13, 14, 15 and 16 consist of a single prismatic block with the same ratio of B/S (B=system width, S=system length), there is obtained an increase in the limiting angle α from 35° in the prism system to 50° in the system of the present invention, and an increase of the limiting angle β from 14.5° to 17°. The limiting angle α lies in a plane extending parallel to the wide rectangular side of the field of view, or of the objective opening 1 and extends parallel to the eyepiece section 23 of the optical axis. This plane will be referred to as "wide-side plane" and in general is a horizontal plane. The limiting angle β lies in a plane extending parallel to the narrow side of the rectangle of the field of view, or of the objective opening 1, and extends parallel to the eyepiece section 23 of the optical axis. This plane will be referred to as the "narrow-side plane" and in general is a vertical plane.

If the observer wishes to view obliquely to the optical axis 21, 22, 23, then the necessary movement of the head of the observer with the periscope of the present invention is less than with the comparable periscope.

If an objective angle of approximately 30° of both periscope is taken as basis, then the observer must move 110 mm. to the side while using the periscope of the present invention, as compared with a 135 mm. if he wishes to observe the same object in the viewing field using a known periscope. Since the above also applies for the objective angle for top-bottom, the space required by the observer, particularly in vertical direction, can be made smaller.

Frequently, the objective space which can be viewed through a single periscope is not sufficient. In such case, a plurality of periscopes are arranged in a semi-circle with respect to each other, the adjacent axes of the periscopes intersecting by 45°. The fields of view of the individual periscopes should overlap somewhat, in which case an eyepiece or objective angle of 30° is necessary. If three systems of prisms are used in the manner indicated, then a lateral movement of the head by 440 mm. is necessary, but if periscopes of the present invention are used, a movement of the head of only 353 mm. is necessary if a given object in the field of view is to be observed alternately from one periscope and then from the neighboring periscope. This manner of observation is frequently necessary when traveling around curves.

In the present invention, if an enlargement or reduction of the image of the field of view is desired, then the reduction of the image of the first system of members is made different from the image enlargement of the second system of members.

If cylindrical lenses are used, it is possible for the image reduction of the first system of members to be no longer compensated for, or not completely compensated for, by a corresponding image enlargement of the second system of members. The image enlargement of the field of view—or parts thereof—can thereby be distorted in a given manner in accordance with the present invention. For example, it may be compressed, while an enlargement of the field of view is still present.

FIG. 3 shows another embodiment of a periscope in which the objective angle or its limiting angle is created in a horizontal plane by a double Galilean system and in a vertical plane by an auxiliary system with collecting lenses. Parts of identical function with the previous embodiment are provided with the same reference numbers, and parts of similar function with reference numbers of derived end positions.

The periscope contains, as a first reflecting surface, a flat mirror 50; as optically diverging partial systems, two concave lenses 63 and 64; as corresponding optically converging partial systems, two convex lenses and prism bodies 65 and 66 which act simultaneously as prismatic deflection systems; and as additional optically converging partial systems, a convex cylindrical lens 55 and a fourth convex cylindrical lens 56. The two lenses 65 and 66 have, on the side of the lenses 63 and 64, flat surfaces 78 and 79 while the surfaces 68 and 69 which face each other, are developed with cylindrical curvature. Between the surfaces 68 and 69 there is a slit 67.

By the development of the lenses 65 and 66 as prismatic deflection systems, the central part of the optical axis is bent so that, instead of the section 23 of the optical axis shown in FIG. 1, there are sections 25 and 26.

The second bend of the optical axis, in accord with the sections 25 and 26, is obtained by a reflective surface 71 of the lens or periscope body 65. The surface 72 of the periscope body 65, and the surface 73 each extend parallel to the sections 25 and 26, respectively, of the optical axis. The periscope body 66 is generally shaped in the form of a rhombic prism, the oblique side being formed by the reflective surface 70. As a slight deviation from the rhombic prism, the limiting surface 79 is arranged perpendicular to the section 23 of the optical axis and is provided, on the side of the diverging partial system and the body 66, with a shoulder corresponding to the limiting surface 79.

The mirror 50 is inclined by an angle of 35° to the object-side section 21 of the optical axis, the first central portion 25 of the optical axis is inclined 20° to the surface 71, and the surface 70 is inclined 55° with respect to the second central section 26 of the optical axis. Between the sections 21 and 25 of the optical axis, there is an angle of 110°, and between the sections 26 and 23 of the optical axis there is an angle of 70°. It is also possible to shape the periscope bodies 65 and 66 in the manner of a bend towards the other side so that the optical axis is bent 70° at its portion 21 and 110° at its position 23. An approximately mirror-image development of the periscope is then obtained in the central portion.

The angles indicated refer to one preferred embodiment of the invention, it being possible to deviate therefrom, and to use other angles. The central part of the periscope should, however, be shaped in such a manner that the bend of the sections 25 and 26 of the optical axis always takes place in the region of a surface 71 which belongs to a single body. The surface 71 should, therefore, not simultaneously form part of the body 66. On the other hand, it is possible for the reflective surface 71 to lie entirely to the body 66 which has the reflective surface 70. With the division indicated, there are obtained relatively small reflective surfaces 50, 71 and 70, so that the expense of producing these reflective surfaces remains moderate.

The cylindrical curvatures of the lenses 66 and 64 is so selected that their image side real or virtual focal point lies at the point 5. The cylindrical lenses 63 and 65 are so curved that their corresponding object side, real or virtual focal point comes to lie at the point 8. The cylindrical lenses 55 and 56 are curved and arranged in the central region of the periscope so that they have a common focal point and, at the other focal point, can be considered either in vertical planes as exit pupil or as entrance pupil. In the examples shown in the drawing, the pupils coincide with the points 5 and 8, although this is not necessary. It is frequently desirable for the exit pupil to be at a minimum distance (for instance of 150 mm.) in front of the last lens surface 56. In this case, it may be advisable to arrange, at the common focal point of the lenses 55, 56, a third cylindrical diverging lens whose curvature is active in the plane of the lenses 55, 56 and which makes it possible to adjust the minimum distance away desired of the exit pupil. In the exit pupil there is established the increased top-bottom objective angle for the planes of curvature of the lenses 55, 56 which are in generally vertical planes, while the right-left field of vision, which is enlarged in accordance with the enlarged limiting angle, must be obtained by movements of the head.

In the embodiment shown in FIG. 3, cylindrical lenses 63, 64, 65 and 66 were used for the optically diverging partial systems, and for the optically converging partial systems. However, it is also possible to use spherical lenses for these partial system, while the additional optically converging partial ystems for binocular viewing are developed as cylindrical lenses.

It is, furthermore, possible to provide three additional optically converging partial systems of which the focal points of the central system coincide with the focal points of the neighboring systems. The reflecting of the optical axis (for instance by the reflective surface 71) can then be done away with. This solution is particularly important in the case of long system lengths, in which connecton field lenses can possibly also be used for the bending of the beam.

Glass or plastic may be used as material for the construction of the lenses, and the distances between the lenses can be filled with air or with some other material whose index of refraction is as small as possible. In this regard, it is possible to effect combinations of glass and plastic in order to compensate for certain defects and obtain desired properties.

What is claimed is:

1. A periscope system for viewing of a field of view from within a closed structure, a rectangular beam-passage surface, whose width exceeds its height in said structure, said periscope comprising an optical system located on a triple bent optical axis and having an objective side section, first and second central sections and an eyepiece side section and comprising a first reflective surface, a first converging cylindrical lens, a first diverging cylindrical lens, a second converging prismatic cylindrical lens, a second reflective surface, an annular slit, a third converging prismatic cylindrical lens having a third reflective surface, a second diverging cylindrical lens and a second converging cylindrical lens, respectively extending along said optical axis from the objective to the eyepiece ends; the convergence of the first and fourth converging cylindrical lenses being established in a narrow-side plane containing the objective side section, the first and second central sections, and the eyepiece section of the optical axis; the divergence of the first and second diverging cylindrical lenses and the convergence of the second and third converging cylindrical lenses both being located in a wide-side plane, which extends perpendicular to the narrow-side plane and which passes through the first and second central sections and the eyepiece section of the optical axis; the virtual focal line of the first diverging cylindrical lens and the focal line of the second converging cylindrical lens being close together in the objective opening; the virtual focal line of the second diverging cylindrical lens and the focal line of the third converging cylindrical lens being close together in the protected space; the first and fourth converging cylindrical lenses located at a distance from each other equal to the sum of their focal lengths said first reflecting surface comprising a metal mirror fastened in the objective opening.

2. A periscope system according to claim 1 in which the second and third converging prismatic lenses fill up substantially all the space between the first and second diverging lenses and have their curved surfaces opposite each other at said slit.

3. A periscope system according to claim 2 in which the second converging cylindrical lens consists of a block of transparent material, said block having a substantially vertical side developed as said second reflective surface.

4. A periscope system according to claim 2 in which the third converging cylindrical lens consists of a block of transparent material having an oblique side developed as a second reflective surface.

5. A periscope system according to claim 1 in which the divergence of the first and second diverging cylindrical lenses is equal to the convergence of the second and third converging cylindrical lenses.

6. A periscope system according to claim 1 in which each beam-passage surface has a surface perpendicular to the optical axis, said surface having a rectangular cross-section and a width which corresponds to the width of the exit opening.

7. A periscope system according to claim 1 wherein the object-side section extends parallel to the eyepiece section of the optical axis, and wherein the first reflective surface is inclined 35° to the object-side section of the optical axis, the second reflective surface is inclined 20° to the first central section of the optical axis, and the third reflective surface is inclined 55° to the second central section of the optical axis.

8. A periscope system according to claim 1 further comprising a third diverging cylindrical lens having a divergence present in the narrow-side plane, and arranged between the second and third converging cylindrical lenses.

References Cited

UNITED STATES PATENTS

| | | | |
|---|---|---|---|
| 1,153,259 | 9/1915 | Saegmuller | 350—52 X |
| 2,423,267 | 7/1947 | Strang | 350—52 X |
| 3,001,450 | 9/1961 | Hyde | 350—49 X |
| 3,013,471 | 12/1961 | Clave et al. | 350—212 X |

FOREIGN PATENTS

| | | |
|---|---|---|
| 3,549 | 7/1915 | Great Britain. |
| 79,184 | 12/1917 | Austria. |
| 370,853 | 2/1907 | France. |
| 83,919 | 8/1920 | Germany. |
| 994,015 | 6/1965 | Great Britain. |

DAVID SCHONBERG, Primary Examiner

PAUL R. GILLIAM, Assistant Examiner

U.S. Cl. X.R.

350—49, 212